July 12, 1949.                    S. S. MADER                    2,475,796
                              TOOL GRINDING MACHINE
Filed March 8, 1946                                          3 Sheets-Sheet 1

Inventor
Stewart S. Mader
By Harold W. Eaton
                Attorney

July 12, 1949.    S. S. MADER    2,475,796
TOOL GRINDING MACHINE

Filed March 8, 1946    3 Sheets-Sheet 2

Inventor
Stewart S. Mader
By Harold W. Eaton
Attorney

July 12, 1949.  S. S. MADER  2,475,796
TOOL GRINDING MACHINE

Filed March 8, 1946  3 Sheets-Sheet 3

Inventor
Stewart S. Mader
By Harold W. Eaton
Attorney

Patented July 12, 1949

2,475,796

UNITED STATES PATENT OFFICE 2,475,796

TOOL GRINDING MACHINE

Stewart S. Mader, Worcester, Mass., assignor to Norton Company, Worcester, Mass., a corporation of Massachusetts Application March 8, 1946, Serial No. 652,880

7 Claims. (Cl. 51—127)

This invention relates to grinding machines and more particularly to apparatus for precisely generating predetermined shapes on cutting tools.

One object of the invention is to provide a simple and thoroughly practical grinding machine for grinding a cutting tool with predetermined clearance and rake angles. Another object of this invention is to provide an improved tool holder which is arranged so that it may be adjusted in two directions so as to grind a predetermined front and side clearance angle on a cutting tool. A further object of the invention is to provide a tool holder having a master template whereby a predetermined shape may be ground on a cutting tool having predetermined clearance angles. Another object of the invention is to provide a tool holder which is adjustable in two directions, namely a tilting adjustment and a rotary adjustment whereby the tool to be ground may be positioned to grind predetermined clearance angles on the cutting tool.

Another object of the invention is to provide a tool holder with a hollow sleeve for supporting the tool to be ground and providing means for precisely tilting the sleeve and for precisely rotarily adjusting the sleeve to position the cutting tool being ground to grind predetermined front and side clearance angles thereon. Another object of the invention is to provide a tool holder which is arranged so that it may be set up for grinding not only the predetermined clearance angles but also the desired and predetermined rake angle on the tool being ground. Other objects will be in part obvious or in part pointed out hereinafter.

The invention accordingly consists in the features of construction, combinations of elements, and arrangements of parts, as will be exemplified in the structure to be hereinafter described, and the scope of the application of which will be indicated in the following claims.

One embodiment of the invention has been illustrated in the accompanying drawings, in which like reference numerals indicate like parts and wherein.

Figure 2:
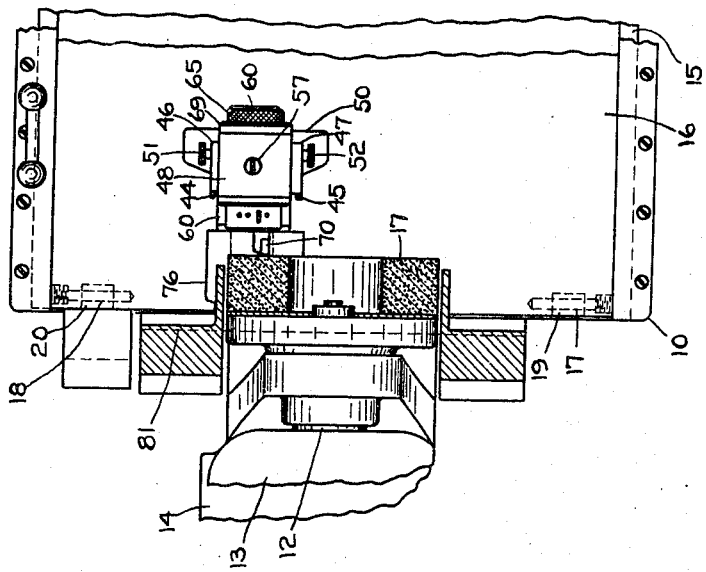
Fig. 2 is a fragmentary plan view of the tool grinding machine, showing the tool holder.

A tool grinding machine has been illustrated in the drawings comprising a base 10 which serves as a support for a rotatable grinding wheel 11 having a plane operative face. The grinding wheel 11 is supported on the end of a wheel spindle 12. The wheel spindle 12 is preferably driven by an electric motor 13 which is supported on a rearwardly extending portion 14 of the base 10.

Figure 1:
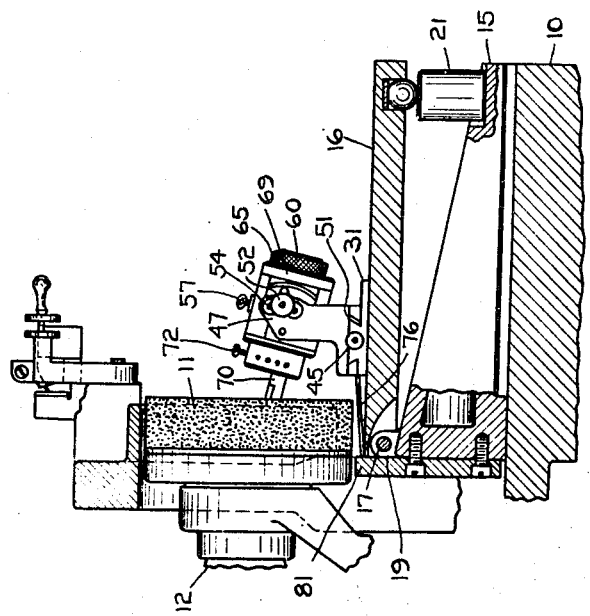
Fig. 1 is a fragmentary cross sectional view through a tool grinding machine, showing the improved tool holder in an operating position.
Figure 4:
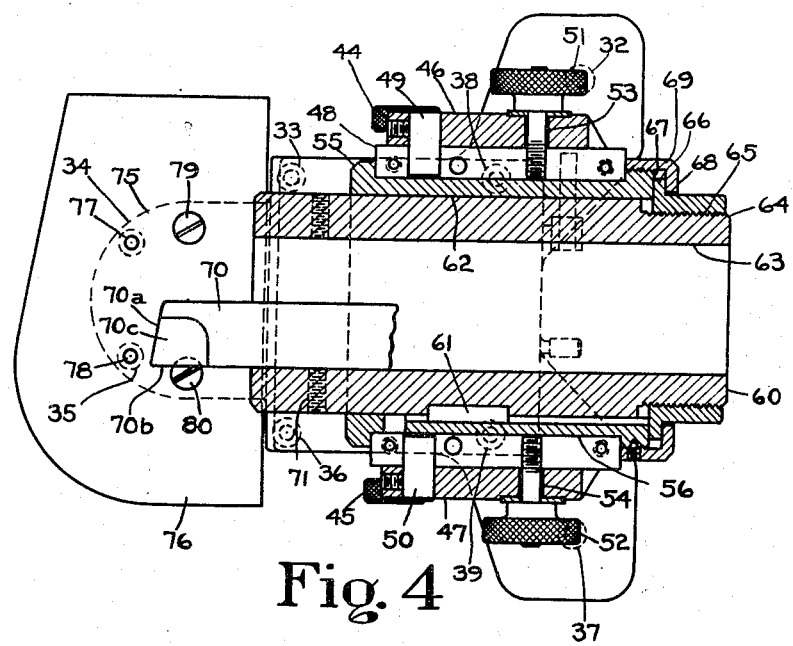
Fig. 4 is a horizontal sectional view taken approximately on the line 4—4 of Fig. 3, through the tool holder.

The base 10 also serves as a support for a slide 15 which is arranged so that it may be adjusted toward and from the operative face of the grinding wheel in a manner similar to that shown in the prior United States patent to W. M. Bura No. 2,381,034 dated August 7, 1945 to which reference may be had for details of disclosure not contained herein. The slide 15 serves as a support for a pivotally mounted tool holder supporting platen 16. The platen 16 is provided with a pair of aligned spaced supporting studs 17 and 18 which are in turn supported in upwardly extending bosses 19 and 20 which are formed integral with the slide 15. As illustrated in Fig. 1 the platen 16 is positioned in a horizontal plane by means of a gage block 21 which is interposed between the slide 15 and the platen 16. If desired the gage block 21 may be substituted with gage blocks of varying heights so that the operative surface of the platen 16 may be readily adjusted into any desired angular position relative to the operative face of the grinding wheel 11.

To attain one of the main objects of this invention an improved tool holder is provided which is arranged so that the cutting tool may be precisely adjusted and positioned for grinding predetermined clearance and rake angles on a cutting tool being ground. As illustrated in the drawings an improved tool holder 30 is provided comprising a base 31 which is provided with a plurality of supporting buttons or plugs 32, 33, 34, 35, 36, 37, 38 and 39 each of which is provided with a plane surface so that the base 31 may be readily moved in any direction on the work supporting platen 16. The base 31 is provided with an upwardly extending dovetailed slide way 40 which mates with a correspondingly shaped slide way formed on a transversely movable slide 41. A nut and screw adjusting mechanism is provided for precisely adjusting the position of the slide 41 transversely relative to the base 31. As illustrated in the drawings a rotatable screw 42 is supported by the slide 41 and meshes with a nut 43 carried by the base 31. A pair of knurled adjusting knobs 44 and 45 are mounted on opposite ends of the screw 42.

Figure 3:
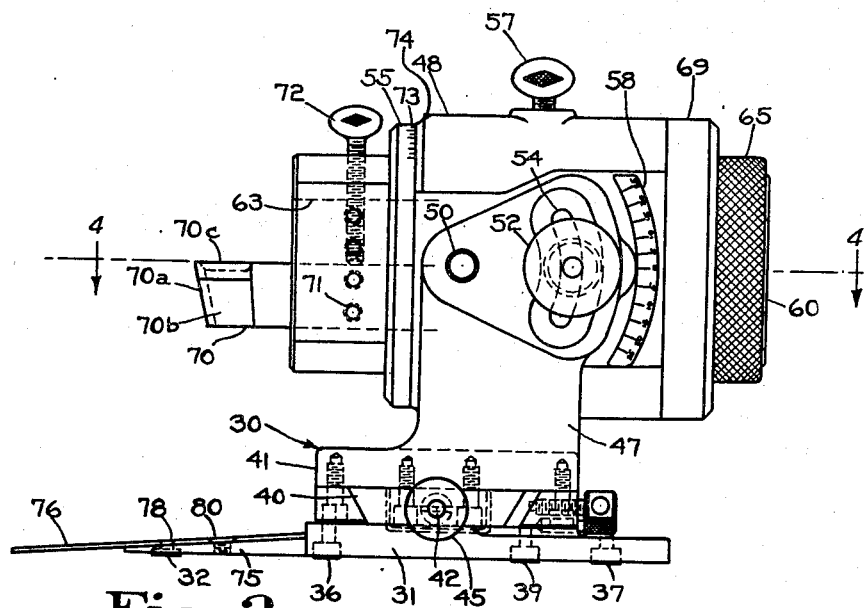
Fig. 3 is a side elevation, on an enlarged scale of the improved tool holder.
Figure 5:
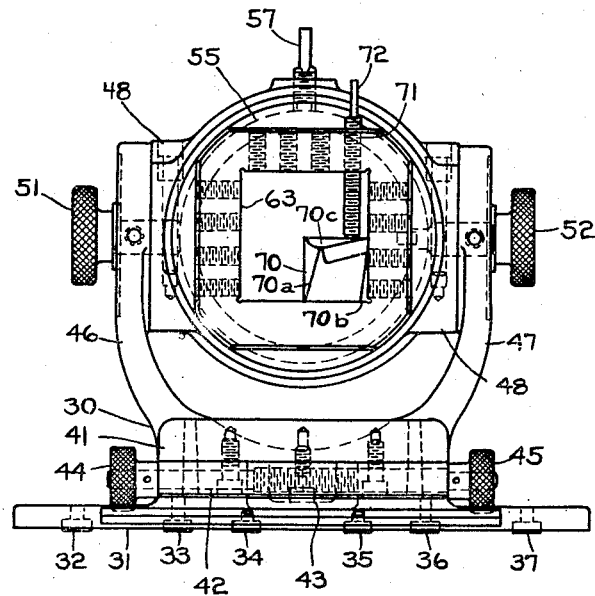
Fig. 5 is a front elevation of the tool holder.

The slide 41 is provided with two integral upwardly extending arms 46 and 47 which serve as a support for a frame 48. The frame 48 is provided with a pair of trunnion studs 49 and 50 which are also supported in the upwardly extending arms 46 and 47. A pair of knurled headed clamping screws 51 and 52 pass through arcuate slots 53 and 54 formed in the arms 46 and 47 respectively and are screw threaded into the frame 48. It will be readily apparent from the foregoing disclosure that the frame 48 may be pivotally adjusted relative to the arms 46 and 47 by loosening the clamping screws 51 and 52, swinging the frame 48 to the desired angle after which the clamping screws 51 and 52 may be again tightened to clamp the frame in the desired position. As illustrated in Fig. 3 a calibrated scale 58 is mounted on the frame 48. An index point is provided on the arm 47 to facilitate readily adjusting the frame 48 to a predetermined angular position.

The frame 48 serves as a support for a rotatable sleeve 55 which is supported in a cylindrical bore 56 formed within the frame 48. A clamping screw 57 is provided on the frame 48 to facilitate clamping the sleeve 55 in the desired position.

A hollow tool holding sleeve 60 is slidably keyed by means of a key 61 within a cylindrical bore 62 formed within the sleeve 55. The sleeve 60 is provided with a square shaped tool supporting aperture 63. The sleeve 60 is provided with a threaded portion 64 which meshes with a threaded knurled collar 65. The collar 65 is provided with an integral flange 66 which serves as an end thrust member to allow rotation of the collar 65, but arranged to prevent endwise movement thereof. In order to hold the flange 66 against endwise movement, the flange 66 is located between a surface 67 formed on the end of the sleeve 55 and a flange 68 formed integral with a collar 69 which is screw threaded onto the sleeve 55. The surface 67 and the flange 68 serve to engage opposite faces of the flange 66 so as to prevent endwise movement thereof. It will be readily apparent from the foregoing disclosure that the knurled collar 65 may be rotated to produce an axial feeding adjustment of the sleeve 60 so as to facilitate an adjustment of the sleeve 60 relative to the base 31 and the slide 41.

To facilitate clamping a cutting tool 70 within the square shaped aperture 63 of the sleeve 60, a plurality of threaded holes 71 are provided. One or more clamping screws 72 may be placed in the desired threaded holes 71 so as to clamp a cutting tool 70 rigidly in position within the aperture 63.

In order to grind the side clearance face 70a, the front clearance angle 70b and the top rake angle 70c to the desired and predetermined angles, the body 48 together with the sleeves 55 and 60 may be adjusted into predetermined angular positions. In order to grind the desired front clearance angle that is face 70b, the frame 48 may be tilted to the desired and predetermined angle after which the frame 48 may be clamped in adjusted position. In order to obtain the desired side clearance angle for precisely grinding side clearance face 70a the screw 57 may be loosened and the sleeve 55 rotarily adjusted relative to the frame 48. To facilitate setting the sleeve 55 a graduated scale 73 is provided on the sleeve 55 and a zero or index point 74 provided on the frame 48. After the sleeve 55 has been positioned as desired for grinding face 70a, the clamping screw 57 may be again clamped to lock the sleeve 55 in the desired adjusted position.

In order to produce a predetermined contour or shape on the end of the cutting tool, it is desirable to provide a master form or template so that successive tools may be ground and reground to the same identical shape. As illustrated in the drawings, the base 31 is provided with an extending projection 75 which serves as a support for a master form or template 76. The template 76 is provided with a pair of locating holes which mate with studs 77 and 78 mounted on the extension 75 of the base 31. A pair of clamping or set screws 79 and 80 are provided for locking the master form or template in a predetermined position relative to the base 10.

In grinding faces of the tool 70, the improved tool holder may be placed in position on the platen 16. The tool holder base 31 may be moved so that the template 76 engages the guide 81. The tool holder 30 may be then moved along the base either longitudinally or transversely with the template 76 at all times in an engagement with the guide 81 so that the desired shape will be produced and predetermined clearance 70a and 70b ground on the front and side faces of the cutting tool 70.

In order to facilitate adjusting the tool being ground relative to the template 76, adjustment may be made by means of the knurled knobs 44 and 45 to produce a transverse movement of the slide 41 so as to adjust the face 70b of the tool 70 relative to the template 76. If it is desired to adjust the face 70a, the sleeve 60 may be adjusted in an axial direction by manipulation of the knurled collar or nut 65. By means of these two adjustments the tool may be ground to the desired extent without resetting the tool within the hollow sleeve 60.

Figure 6:
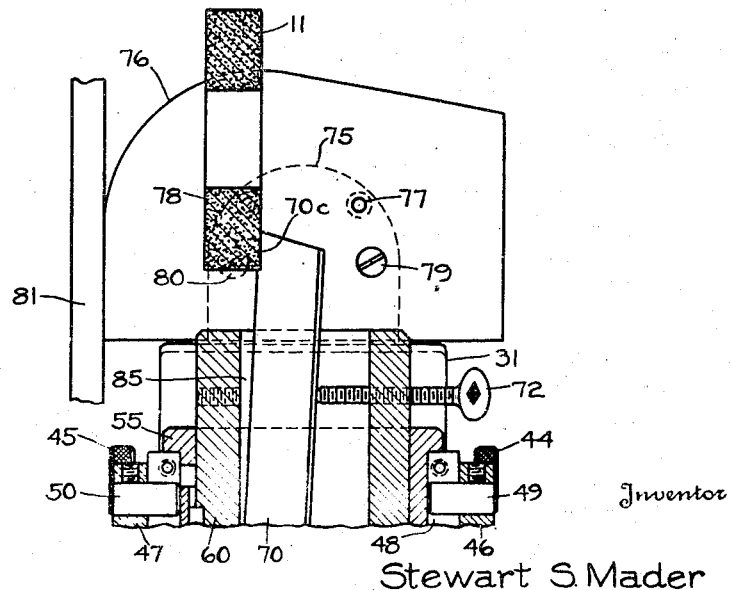
Fig. 6 is a fragmentary horizontal sectional view through the tool holder, showing a tool set-up for grinding the top rake.

If it is desired to grind a predetermined rake angle on the top of the tool, the tool 70 may be placed in the position illustrated in Fig. 6. In case a back rake angle is desired on the top face of the tool 70c, a wedge block 85 having an angle equal to the desired back rake angle is positioned within the aperture 63 of the sleeve 60 to position the tool as illustrated in Fig. 6 so that when the template 76 is in an engagement with the guide 81, a top back rake angle of the desired and predetermined extent will be provided. In case a side rake angle, as well as a back rake angle is desired, the sleeve 60 may be rotarily adjusted to the desired angular position so that a combined back and side rake angle will be produced.

The operation of this improved tool grinding apparatus will be readily apparent from the foregoing disclosure. A tool to be ground is clamped in position with the hollow sleeve 60. A template 76 having the desired contour is then clamped in position on the tool holder. The frame 48 is then adjusted to the desired angular position and the sleeve 55 rotated to angularly position the cutting tool so that when the tool holder 30 is moved on the platen 16 with the template 76 in engagement with the guide 81 a predetermined side and front clearance angle will be produced on the tool 70 and at the same time the desired contour will be ground thereon. As previously described feeding unit adjustments may be made to move the slide 41 transversely and the sleeve 60 axially so that the desired grinding operation may be accomplished upon the cutting tool 70.

It will thus be seen that there has been provided by this invention apparatus in which the various objects hereinabove set forth together with many thoroughly practical advantages are successfully achieved. As many possible embodiments may be made of the above invention and as many changes might be made in the embodiment above set forth, it is to be understood that all matter hereinbefore set forth or shown in the accompanying drawings is to be interpreted as illustrative and not in a limiting sense.

I claim:

1. In a tool holder for tool grinding machines including a base, a frame pivotally mounted on said base, a hollow sleeve rotatably supported in said frame, means to clamp a tool to be ground within said sleeve, precision means including a graduated scale precisely to tilt said frame, precision means including a graduated scale precisely to rotate said sleeve so as to position a tool to be ground, means to clamp said sleeve against a rotary motion in the desired and predetermined position to facilitate grinding a predetermined front and side clearance on a tool to be ground, and means including a nut and screw mechanism interposed between the sleeve and frame to feed said sleeve relative to said frame and base so as to advance the tool being ground during a grinding operation.

2. In a tool holder for tool grinding machines including a base having a plane supporting and guiding surface, a transversely movable slide on said base, a feeding mechanism to adjust said slide transversely relative to the base, a frame pivotally supported on said slide, means precisely to adjust said frame angularly relative to said slide, a sleeve rotatably supported in said frame, clamping means to clamp said sleeve in adjusted position relative to said frame, a non-rotatable hollow tool supporting sleeve slidably keyed within said first sleeve, means to clamp a tool to be ground within said hollow sleeve, and means including a screw formed on the periphery of the hollow sleeve and a rotatable nut rotatably supported on said rotatable sleeve to facilitate feeding said hollow sleeve axially relative to said first sleeve and frame to facilitate feeding the tool during a grinding operation.

3. In a tool holder for tool grinding machines including a base having a plane supporting and guiding surface, a transversely movable slide on said base, a feeding mechanism to adjust said slide transversely relative to the base, a template on said base, a frame pivotally supported on said slide, means precisely to adjust said frame angularly relative to said slide, a sleeve rotatably supported in said frame, clamping means to clamp said sleeve in adjusted position relative to said frame, a hollow tool supporting sleeve slidably keyed within said first sleeve, means to clamp a tool to be ground within said hollow sleeve, and means including a screw formed on the periphery of the hollow sleeve and a rotatable nut rotatably supported on said first sleeve to facilitate feeding said hollow sleeve axially relative to said first sleeve and frame to facilitate feeding the tool during a grinding operation, said feeding mechanism serving to adjust said slide relative to said template and base so as to adjust the side face of the tool being ground relative to the operative face of the grinding wheel.

4. In a tool holder for a tool grinding machine having a plane faced rotatable grinding wheel, an adjustable platen having a guide, a base having a plane supporting and guiding surface, a template detachably mounted on said base, a frame pivotally mounted on said base, means precisely to adjust said frame angularly relative to said base, a sleeve rotatably supported in said frame, precise means to adjust and clamp said sleeve in adjusted position relative to said frame, a hollow tool supporting sleeve slidably keyed within said first sleeve, means to clamp a tool to be ground within said hollow sleeve in a predetermined position relative to said template, and means to feed said hollow sleeve axially relative to said first sleeve and frame to facilitate feeding said tool during a grinding operation, said guide and template serving to generate a predetermined contour on said tool as the base is moved on said platen with the template in engagement with said guide.

5. In a tool holder for a tool grinding machine having a base including a plane supporting and guiding surface, a transversely movable slide on said base, a nut and screw mechanism for adjusting said slide, a template detachably mounted on said base, a frame pivotally supported on said slide, means precisely to adjust said frame angularly relative to said slide, a sleeve rotatably supported in said frame, clamping means to clamp said sleeve in adjusted position relative to said frame, a hollow tool supporting sleeve slidably keyed within said first sleeve, means to clamp a tool to be ground within said hollow sleeve, and means to feed said hollow sleeve axially relative to said first sleeve and frame to facilitate a feeding movement of the tool during a grinding operation.

6. In a tool holder for tool grinding machines having a base including a plane supporting and guiding surface, a transversely movable slide on said base, a nut and screw mechanism for adjusting said slide, a frame pivotally supported on said slide, means precisely to adjust said frame angularly relative to said slide, a sleeve rotatably supported in said frame, clamping means to clamp said sleeve in adjusted position relative to said frame, a hollow tool supporting sleeve slidably keyed within said first sleeve, means to clamp a tool to be ground within said hollow sleeve, a threaded portion on the outer end of said hollow sleeve, and a rotatable nut engaging said threaded portion which is held against axial movement to facilitate feeding the hollow sleeve and tool relative to said base and frame during a grinding operation.

7. In a tool holder for a tool grinding machine including a base having a plane supporting and guiding surface, a template detachably mounted on said base, a transversely adjustable slide on said base, a yoke formed integral with said slide having a pair of upwardly extending spaced arms, a frame pivotally supported by said arms, aligned opposed pivoted studs on said arms to support said frame, arcuate slots in each of said arms, clamping screws passing through said slots and screw threaded into said frame to facilitate a precise angular tilting adjustment of said frame so as to grind a predetermined clearance angle on a tool to be ground, a sleeve rotatably journalled in said frame, means to clamp said sleeve in adjusted position, a hollow tool holding sleeve slidably keyed within said first sleeve, means to clamp a tool to be ground within said hollow sleeve, and means including a nut and screw mechanism to feed said hollow sleeve axially relative to said first sleeve to facilitate feeding a tool to be ground relative to said template.

STEWART S. MADER.

REFERENCES CITED

The following references are of record in the file of this patent:

UNITED STATES PATENTS

| Number | Name | Date |
|---|---|---|
| 141,760 | Card | Aug. 12, 1873 |
| 467,857 | Conradson | Jan. 26, 1892 |
| 1,072,629 | Lumsden | Sept. 9, 1913 |
| 1,710,647 | Probert et al. | Apr. 23, 1929 |
| 1,807,999 | McMurtry | June 2, 1931 |
| 2,144,095 | Zwick | Jan. 17, 1939 |
| 2,246,023 | Spurling | June 17, 1941 |
| 2,332,510 | Franzen | Oct. 26, 1943 |
| 2,365,759 | Howe | Dec. 26, 1944 |
| 2,375,619 | Bura | May 8, 1945 |